US010931611B2

(12) United States Patent
Dotan-Cohen et al.

(10) Patent No.: US 10,931,611 B2
(45) Date of Patent: Feb. 23, 2021

(54) MESSAGE PROPRIETY DETERMINATION AND ALERT PRESENTATION ON A COMPUTING DEVICE

(71) Applicant: MICROSOFT TECHNOLOGY LICENSING, LLC, Redmond, WA (US)

(72) Inventors: Dikla Dotan-Cohen, Herzliya (IL); Ido Priness, Herzliya (IL); Eyal Menahem Kolman, Raanana (IL)

( * ) Notice: Subject to any disclaimer, the term of this patent is extended or adjusted under 35 U.S.C. 154(b) by 110 days.

(21) Appl. No.: 15/988,772

(22) Filed: May 24, 2018

(65) Prior Publication Data

US 2019/0364001 A1 Nov. 28, 2019

(51) Int. Cl.
*G06F 15/16* (2006.01)
*H04L 12/58* (2006.01)

(52) U.S. Cl.
CPC .............. *H04L 51/12* (2013.01); *H04L 51/24* (2013.01)

(58) Field of Classification Search
CPC ................................ H04L 51/12; H04L 51/24
USPC .......................... 709/206, 207, 223, 224, 226
See application file for complete search history.

(56) References Cited

U.S. PATENT DOCUMENTS

| | | | |
|---|---|---|---|
| 6,546,390 B1 | 4/2003 | Pollack et al. | |
| 7,742,944 B2 | 6/2010 | Dicker et al. | |
| 8,271,598 B2 | 9/2012 | Guy et al. | |
| 8,364,467 B1 | 1/2013 | Bowman et al. | |
| 9,330,145 B2 | 5/2016 | Satyanarayanan | |
| 9,619,989 B1 * | 4/2017 | Ewing | G08B 21/245 |
| 9,718,402 B2 * | 8/2017 | Smyth | B60Q 9/00 |
| 2009/0055481 A1 | 2/2009 | Carmel et al. | |
| 2013/0166657 A1 | 6/2013 | Tadayon | |
| 2014/0025758 A1 * | 1/2014 | Glowacki | H04L 12/1895 709/206 |
| 2014/0074850 A1 * | 3/2014 | Noel | G06F 9/542 707/741 |
| 2015/0358266 A1 | 12/2015 | Kaplinger et al. | |
| 2016/0182410 A1 | 6/2016 | Janakiraman et al. | |
| 2016/0182429 A1 | 6/2016 | Mirski-fitton et al. | |
| 2017/0366491 A1 * | 12/2017 | DeLuca | H04L 51/34 |

OTHER PUBLICATIONS

"International Search Report and Written Opinion Issued in PCT Application No. PCT/US19/032075", dated Sep. 6, 2019, 12 Pages.

\* cited by examiner

*Primary Examiner* — Liang Che A Wang
(74) *Attorney, Agent, or Firm* — Shook, Hardy & Bacon, LLP

(57) ABSTRACT

Technology is disclosed for controlling the presentation of electronic messages on personal computing devices (i.e., user devices). The technology reviews a first electronic message to be sent. The technology determines any of a set of previously received electronic messages that are related to the first electronic message, and comparing the first electronic message to be sent to the determined set of previously received electronic messages related to the first electronic message. Based at least on the comparing, the technology compares the propriety of sending the first electronic message. The previously received electronic messages may be, in some embodiments, a user message model or a group message model. Embodiments also include generating an alert of the potential for the first electronic message to be outside the parameters of the user model, the message model or the group message model.

20 Claims, 5 Drawing Sheets

MESSAGE PROPRIETY DETERMINATION AND ALERT PRESENTATION ON A COMPUTING DEVICE

BACKGROUND

Electronic messaging is now used by many people to communicate, both in their business and personal settings. It is not uncommon for those sending messages to inadvertently send a message to someone unintended, or with unintended content (either in the message body or an attachment, for example). For example, a user might start to address a message to a user, and have the messaging application "auto-complete" the address. But this auto-complete may be to a different addressee than the user intended, and may go unnoticed by the user. A user may also send messages to a group, having confidence about the group make-up, without knowing that members of the group have changed in some way (for example, new members of the group may have been added without the user's knowledge). In some instances, the message may be harmless, but in others, the message may have unintended negative consequences. For example, a user may send content, or use language, that may be, or seem, inappropriate to the recipient(s), be embarrassing to the sender or recipient, etc. And, once sent, it can be difficult to unwind the consequences of the sent message. One example of a technical solution to address some of these problems is the message recall functionality. However, this technology is not only often ineffective, because frequently the sent messages are unable to be recalled, but the recall can notify the recipient of the mistake, thereby resulting in further embarrassment to the sender.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed towards technologies for improving the sending of electronic messages on personal computing devices (sometimes referred to herein as mobile devices or user devices). In particular, embodiments provide technology to analyze a first electronic message to be sent. The technology determines any of a set of previously received electronic messages that are related to the first electronic message, and compares the first electronic message to be sent to the determined set of previously received electronic messages related to the first electronic message. Based at least on the comparing, the technology determines the probability of the propriety of sending the first electronic message. The previously received electronic messages may be, in some embodiments, utilized for a user message model or a group message model. Embodiments also include generating a notification of the potential for the first electronic message to be outside the parameters of the user model, the message model or the group message model. (In some embodiments, the notification informs the user of the probability of message propriety or impropriety.)

BRIEF DESCRIPTION OF THE DRAWINGS

Aspects of the disclosure are described in detail below with reference to the attached drawing figures, wherein.

DETAILED DESCRIPTION

Figure 1:
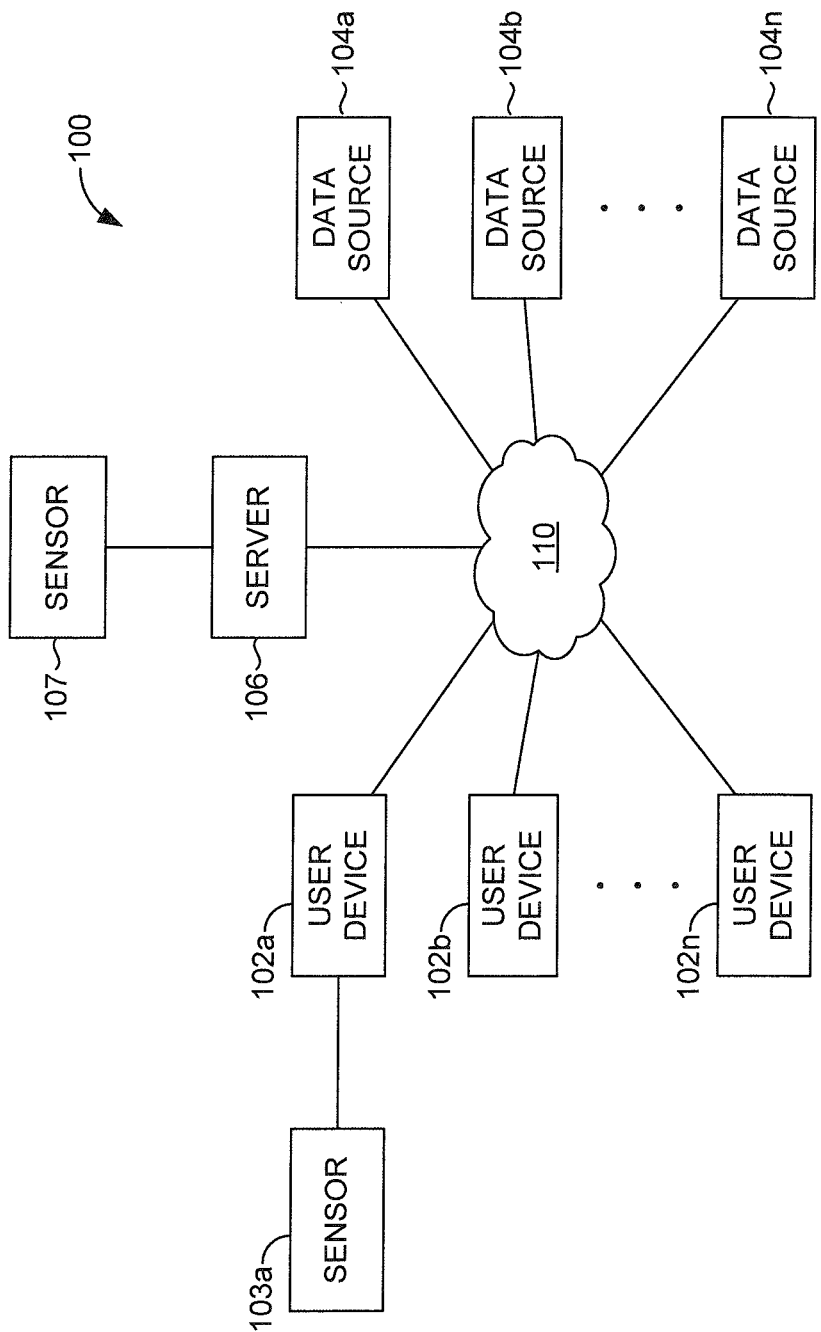
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Aspects of the present disclosure relate to technology for improving electronic message communication on personal computing devices (sometimes referred to herein as mobile devices or user devices). The coalescence of telecommunications and personal computing technologies in the modern era has enabled, for the first time in human history, near instantaneous communication with a ubiquity of personal computing resources (including mobile personal computing devices and cloud-computing coupled with communication networks). As a result, it is increasingly common for users to use, and rely on, one or more mobile computing devices throughout the day for communication based tasks. But the rise in use of electronic messages, such as emails or text messages, also increases the risk that users may inadvertently send messages to unintended recipient(s), or with content that may be unintended as well. Moreover, the conventional technologies surrounding electronic messaging continue to allow this unintended messaging, without alerting the user or taking other action. The progression of telecommunications and personal computing technologies has elevated time-based pressures on users to respond or act on incoming electronic messages, but have so far not provided a mechanism to determine message content and context, to review addressees, nor provide any type of user alert or corrective action for messages that may warrant it. Among other benefits, aspects described herein improve technology by determining the addressees, content and context of electronic messages, and determining whether any user alerts or other corrective action are warranted based on user models, message features, and one or more group models and presenting a user notification or taking other corrective action when warranted.

In other embodiments, solutions provided herein include technologies for improving the delivery of electronic messages on computing devices. In particular, some of these technologies alert, reveal or highlight possible troublesome aspects of a message (whether it be the message content, the context or one or more potentially troublesome addressees, for example). In some embodiments, the solutions provided herein identify messages, portions of messages, or addressees that are determined to be potentially problematic (a probability of propriety or impropriety) for a user to send based upon a user's context, the content of the message, the context of the message, and the features of the group to whom the message is addressed, and rules or logic indicating, or used to determine, what is likely considered problematic by the user. The user's context data may include, for example and without limitation, location data (e.g., the location of the mobile device or location history), which may include venue information; application (or "app") usage; app installation; communication such as incoming or outgoing calls, texts, emails, and instant messages; information derived from applications or computing services, online activity of the user, or accounts associated with the user (e.g., email accounts, social media accounts), such as calendar events, purchases or financial transactions, social media activity, app notifications, or information from a virtual assistant associated with the user; user searches or search history; motion information such as accelerometric/gyroscopic information or motion derived from sensing changes in location information; physiological information (e.g., blood pressure or heart rate, which may be provided from a wearable mobile computing device); information characterizing a state or usage of the device, such as whether the device is likely being used by the owner or another person, or other information related to the user's current or historic activity that is detectable or otherwise determinable via device computing device or online computing service associated with the user. As described below, contextual information may also include interpretive information that is derived from other contextual information, such as determining a location venue (e.g., a particular restaurant) from location-sensor data, such sensor information from a GPS sensor or determined from nearby Wi-Fi access points. The rules or logic may include default parameters, parameters that are learned or inferred from the user or a similar user, as well as settings and preferences that a user can selectively invoke, and may further include a configuration user interface enabling a user to configure specific aspects of how message propriety is determined and presented.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 500 described in connection to FIG. 5, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 5 herein. By way of example and not limitation, a user device may be embodied as a personal computer (PC), a laptop computer, a mobile or mobile device, a smartphone, a smart speaker, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) user data, which may include user-activity related data, to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors, which may be integrated into or associated with one or more of the user device(s) 102a, 102b, or 102n or server 106. Examples of sensed user data made available by data sources 104a through 104n are described further in connection to user-data collection component 210 of FIG. 2.

Figure 2:
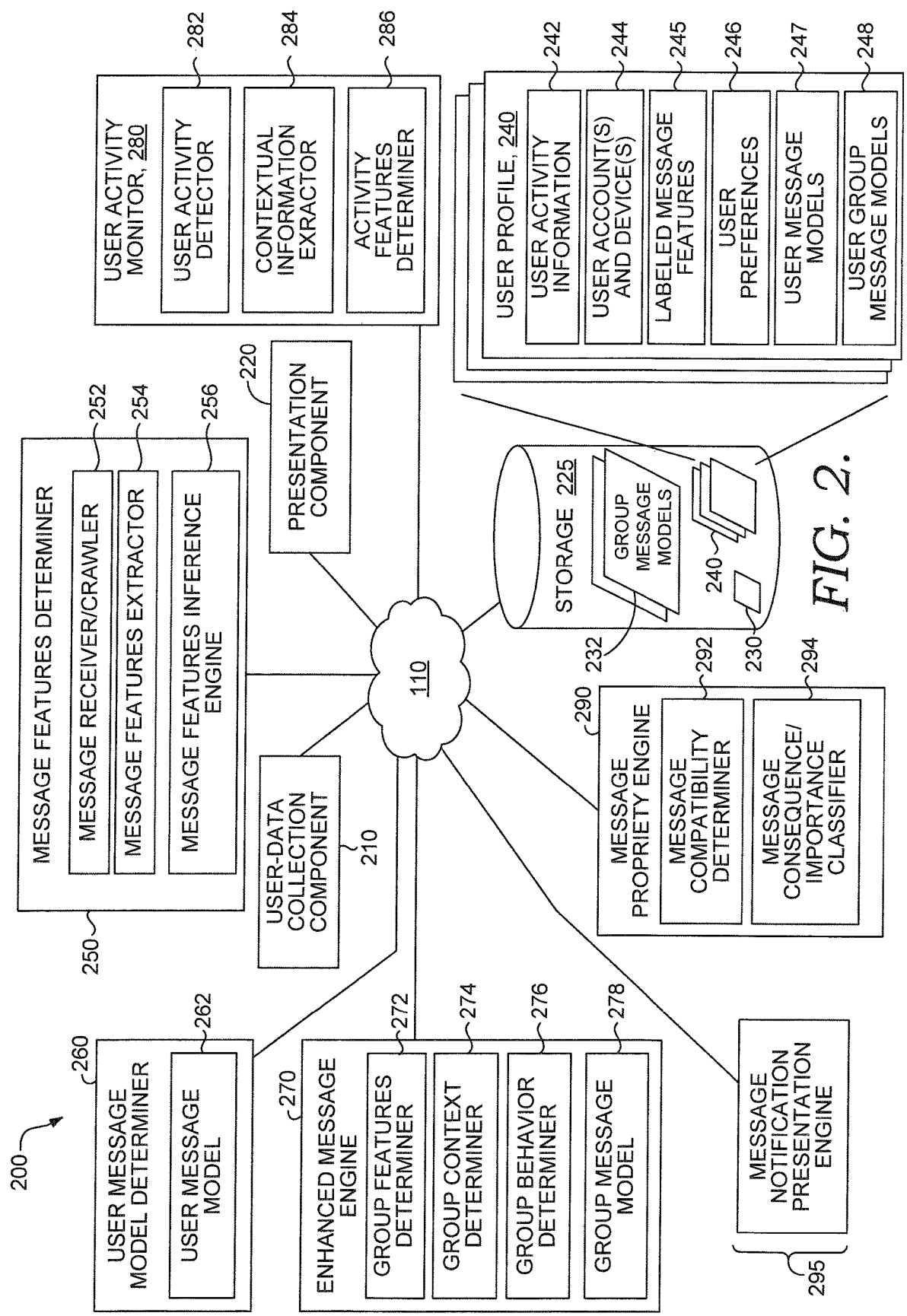
FIG. 2 is a diagram depicting an example computing architecture suitable for implementing aspects of the present disclosure.

Operating environment 100 can be utilized to implement one or more of the components of system 200, described in FIG. 2, including components for collecting user data, determining a user model, determining message features, determining a group message model, and determining message propriety; taking a corrective action; and/or presenting an alert or other notification to users. Operating environment 100 also can be utilized for implementing aspects of method 400 in FIG. 4.

Referring now to FIG. 2, with FIG. 1, a block diagram is provided showing aspects of an example computing system architecture suitable for implementing an embodiment of this disclosure and designated generally as system 200. System 200 represents only one example of suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, presentation component 220, storage 225, message features determiner 250, user message model determiner 260, group message model determiner 270, user activity monitor 280, message propriety engine 290, and message notification presentation engine 295. User-data collection component 210, presentation component 220, message features determiner 250 (including its components 252, 254 and 256), user message model determiner 260, group message model determiner 270 (including its components 272, 274 and 276), user activity monitor 280 (including its components 282, 284, and 286), message propriety engine 290 (including its components 292 and 294) and message notification presentation engine 295 may be embodied as a set of compiled computer instructions or functions, program modules, computer software services, or an arrangement of processes carried out on one or more computer systems, such as computing device 500 described in connection to FIG. 5, for example.

In one embodiment, the functions performed by components of system 200 are associated with one or more computer messaging applications, services, or routines (such as an e-mail manager). In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, user-data collection component 210 is generally responsible for accessing or receiving (and in some cases also identifying) user data from one or more data sources, such as data sources 104a and 104b through 104n of FIG. 1. In some embodiments, user-data collection component 210 may be employed to facilitate the accumulation of user data of a particular user (or in some cases, a plurality of users including crowdsourced data) for user activity monitor 280. The data may be received (or accessed), and optionally accumulated, reformatted, and/or combined, by user-data collection component 210 and stored in one or more data stores such as storage 225, where it may be available to other components of system 200. For example, the user data may be stored in or associated with a user profile 240, as described herein. In some embodiments, any personally identifying data (i.e., user data that specifically identifies particular users) is either not uploaded or otherwise provided from the one or more data sources with user data, is not permanently stored, and/or is not made available to user activity monitor 280.

User data may be received from a variety of sources where the data may be available in a variety of formats. For example, in some embodiments, user data received via user-data collection component 210 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; communications data including calls, texts, instant messages, and emails; website posts; other user data associated with communication events; etc.) including, in some embodiments, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, Cellular network, or IP address data), and nearly any other source of data that may be sensed or determined as described herein.

In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 210 receives or accesses data continuously, periodically, or as needed.

User activity monitor 280 is generally responsible for monitoring user data for information that may be used for determining user activity information, which may include identifying and/or tracking features (sometimes referred to herein as "variables") or other information regarding specific user actions and related contextual information. Embodiments of user activity monitor 280 may determine, from the monitored user data, user activity associated with a particular user. As described previously, the user activity information determined by user activity monitor 280 may include user activity information from multiple user devices associated with the user and/or from cloud-based services associated with the user (such as email, calendars, social-media, or similar information sources), and which may include contextual information associated with the identified user activity. User activity monitor 280 may determine current or near-real-time user activity information and may also determine historical user activity information, in some embodiments, which may be determined based on gathering observations of user activity over time, accessing user logs of past activity (such as browsing history or prior communications, which may include communications across different messaging platforms, for example). Further, in some embodiments, user activity monitor 280 may determine user activity (which may include historical activity) from other similar users (i.e., crowdsourcing), as described previously.

In some embodiments, information determined by user activity monitor 280 may be provided to message features determiner 250, user message model determiner 260 and/or message propriety engine 290 including information regarding the current context and historical context (historical observations). As described previously, user activity features may be determined by monitoring user data received from user-data collection component 210. In some embodiments, the user data and/or information about the user activity determined from the user data is stored in a user profile, such as user profile 240.

In an embodiment, user activity monitor 280 comprises one or more applications or services that analyze information detected via one or more user devices used by the user and/or cloud-based services associated with the user, to determine activity information and related contextual information. Information about user devices associated with a user may be determined from the user data made available via user-data collection component 210, and may be provided to message features determiner 250, user message model determiner 260, group message model determiner 270, user activity monitor 280, message propriety engine 290, or other components of system 200.

More specifically, in some implementations of user activity monitor 280, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like.

Some embodiments of user activity monitor 280, or its subcomponents, may determine a device name or identification (device ID) for each device associated with a user. This information about the identified user devices associated with a user may be stored in a user profile associated with the user, such as in user accounts and devices 244 of user profile 240. In an embodiment, the user devices may be polled, interrogated, or otherwise analyzed to determine information about the devices. This information may be used for determining a label or identification of the device (e.g., a device ID) so that user interaction with the device may be recognized from user data by user activity monitor 280. In some embodiments, users may declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

As shown in example system 200, user activity monitor 280 comprises a user activity detector 282, contextual information extractor 284, and an activity features determiner 286. In some embodiments, user activity monitor 280, one or more of its subcomponents, or other components of system 200, such as message features determiner 250, user message model determiner 260, or message propriety engine 290, may determine interpretive data from received user data. Interpretive data corresponds to data utilized by these components of system 200 or subcomponents of user activity monitor 280 to interpret user data. For example, interpretive data can be used to provide other context to user data, which can support determinations or inferences made by the components or subcomponents. Moreover, it is contemplated that embodiments of user activity monitor 280, its subcomponents, and other components of system 200 may use user data and/or user data in combination with interpretive data for carrying out the objectives of the subcomponents described herein. Additionally, although several examples of how user activity monitor 280 and its subcomponents may identify user activity information are described herein, many variations of user activity identification and user activity monitoring are possible in various embodiments of the disclosure.

User activity detector 282, in general, is responsible for determining (or identifying) a user action or activity event has occurred. Embodiments of activity detector 282 may be used for determining current user activity or one or more historical user actions. Some embodiments of activity detector 282 may monitor user data for activity-related features or variables corresponding to user activity such as indications of applications launched or accessed, files accessed, modified, copied, etc., websites navigated to, online content downloaded and rendered or played, or similar user activities.

Additionally, some embodiments of user activity detector 282 extract from the user data information about user activity, which may include current user activity, historical user activity, and/or related information such as contextual information. (Alternatively or in addition, in some embodiments, contextual information extractor 284 determines and extracts contextual information. Similarly, in some embodiments, activity features determiner 286 extracts information about user activity, such as user-activity related features, based on an identification of the activity determined by user activity detector 282.) Examples of extracted user activity information may include app usage, online activity, searches, calls, usage duration, application data (e.g., emails, messages, posts, user status, notifications), or nearly any other data related to user interactions with the user device or user activity via a user device. Among other components of system 200, the extracted user activity information determined by user activity detector 282 may be provided to other subcomponents of user activity monitor 280, message features determiner 250, user message model determiner 260, or message propriety message engine 290. For example, the user activity information may be used by user message model determiner 260 for determining user context surrounding user messages, or may be used by message propriety engine 290 for determining a compatibility score regarding a confidence that a message is being sent to a group consistent with the user activity information, such as a message propriety probability as described below. Further, the extracted user activity may be stored in a user profile associated with the user, such as in user activity information component 242 of user profile 240. (In some embodiments, user activity detector 282 or user activity monitor 280 (or its other sub components) performs conflation on the detected user activity information. For example, overlapping information may be merged and duplicated or redundant information eliminated.)

In some embodiments, user activity detector 282 runs on or in association with each user device for a user. User activity detector 282 may include functionality that polls or analyzes aspects of the operating system to determine user activity related features (such as installed or running applications or file accesses and modifications, for example), network communications, and/or other user actions detectable via the user device including sequences of actions.

Contextual information extractor 284, in general, is responsible for determining contextual information related to the user activity (detected by user activity detector 282 or user activity monitor 280), such as context features or variables associated with user activity, related information, and user-related activity, and is further responsible for associating the determined contextual information with the detected user activity. In some embodiments, contextual information extractor 284 may associate the determined contextual information with the related user activity and may also log the contextual information with the associated user activity. Alternatively, the association or logging may be carried out by another service. For example, some embodiments of contextual information extractor 284 provide the determined contextual information to activity features determiner 286, which determines activity features of the user activity and/or related contextual information.

Some embodiments of contextual information extractor 284 determine contextual information related to user activity such as entities identified in a user activity or related to the activity (e.g., the other party of a call conducted by the user) or a location or venue of the user device when user activity is detected. By way of example and not limitation, this may include context features such as location data; which may be represented as a location stamp associated with the activity; contextual information about the location, such as venue information (e.g., this is the user's office location, home location, school, restaurant, movie theater), yellow pages identifier (YPID) information, time, day, and/or date, which may be represented as a time stamp associated with the activity; user device characteristics or user device identification information regarding the device on which the user carried out the activity; duration of the user activity, other user activity/activities preceding and/or following the user activity (which may include sequences of user activities), other information about the activity such as entities associated with the activity (e.g., venues, people, objects), information detected by sensor(s) on user devices associated with the user that is concurrent or substantially concurrent to the user activity (e.g., motion information or physiological information detected on a fitness tracking user device, listening to music, which may be detected via a microphone sensor if the source of the music is not a user device), or any other information related to the user activity that is detectable that may be used for determining patterns of user activity.

In embodiments using contextual information related to user devices, a user device may be identified by detecting and analyzing characteristics of the user device, such as device hardware, software such as OS, network-related characteristics, user accounts accessed via the device, and similar characteristics. For example, as described previously, information about a user device may be determined using functionality of many operating systems to provide information about the hardware, OS version, network connection information, installed application, or the like. In some embodiments, a device name or identification (device ID) may be determined for each device associated with a user. This information about the identified user devices associated with a user may be stored in a user profile associated with the user, such as in user account(s) and device(s) 244 of user profile 240. In an embodiment, the user devices may be polled, interrogated, or otherwise analyzed to determine contextual information about the devices. This information may be used for determining a label or identification of the device (e.g., a device ID) so that user activity on one user device may be recognized and distinguished from user activity on another user device. Further, as described previously, in some embodiments, users may declare or register a user device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

In some implementations, contextual information extractor 284 may receive user data from user-data collection component 210, parse the data, in some instances, and identify and extract context features or variables (which may also be carried out by activity features determiner 286). Context features may be stored as a related set of contextual information associated with the user activity, and may be stored in a user profile such as in user activity information component 242. In some embodiments, the user activity information determined by user activity monitor 280, such as the activity features (which may include context features) are stored in user activity information component 242 or as part of a user message model 247, as described below, and may be used for determining relevance of communication messages to the user, based on the user's activity. For example, if the user's activity indicates the user browses websites on certain topics, then the user message model 247 model may include model parameters indicating that those topics are relevant to the user. Similarly, if the user activity indicates that the user is spending time working with particular file names, project names, client names, or other topics or entities, then those topics or entities may be included in the user message model, as described further herein. In some instances, user message model parameters corresponding to these topics or entities (or corresponding to other user activity features) may be weighted according to the frequency, amount of time, and/or recency (i.e., the "freshness" of the activity, which may be used for a decaying weighting, with more recent activity receiving a higher weight than "stale" activity that occurred farther in the past) that these topics or entities (or the other user activity features) occur in the user activity. In some cases, contextual information may be used by message propriety engine 290, such as for determining user context and whether a particular message has content (vocabulary, attachments, or other information) that is out of character for such a message from the user, thus lowering the probability of message propriety. Contextual information also may be determined from the user data of one or more users, in some embodiments, which may be provided by user-data collection component 210 in lieu of or in addition to user activity information for the particular user.

Continuing with system 200 of FIG. 2, message features determiner 250 is generally responsible for determining features of electronic messages. Electronic messages could include, for example, and without limitation, email; instant messages; direct messages; chats; texts; social media communications, which may include tweets, posts, snaps, picture-grams, and other shared-media communications; voicemail, video-mail, mixed-media messages, and similar electronic communication formats. In some embodiments, message features determiner 250 may run on a client computing device, on server, as a distributed application across multiple devices, or in the cloud. At a high level, message features determiner may receive an electronic message, or may crawl other computer application(s) or service(s) to discover electronic messages with a message receiver/crawler 252. In other words, message receiver/crawler 252 acts as the intake for the message features determiner 250. The messages from message receiver/crawler 252 are provided to, or accessed by, a message features extractor 254. Message features extractor 254 examines each message and extracts, or parses the message for, known features. As an example, and without limitation, message features extracted by message features extractor 254 may include message recipients (including categories for those the message was sent directly to, those who were copied, or whether the message was forwarded) the state of the message (e.g., for an email, whether it is unopened, forwarded, or replied to, for example), date/time the message was sent (which might be used for recency analysis, for example), spelling, grammar, vocabulary of the content of the message (the actual words used in the message), information derived from the content of the message, which may include the message subject line or heading (e.g., topics, entities, such as places or people, events, projects, action items, requests, files, or other information) in the message, or attachments to the message.

In some embodiments, message features extractor 254 may determine certain message features based on other extracted features. For example, a feature characterizing message formality or message sentiment may be determined based on features characterizing the grammar, the salutation and the closing of a message. In some embodiments, the message features determined by message features extractor 254 may comprise binary values (e.g., is there profanity or not), numerical values (which may comprise a count), such as the number of misspellings in a message, or may comprise a score indicating degree of the presence of a certain feature, such as message formality, or message sentiment, that may be determined based on other message features (e.g., the salutation) and pre-defined rules. For instance, the presence of a salutation and closing, as well as the specific salutation and closing utilized may correspond to a numerical value that is summed to represent a score for the message formality. (Similarly, if the message features corresponding to a salutation, closing, and/or grammar, are numerical, then these feature values may be summed and used for the formality feature, in some embodiments.) Message sentiment may be represented as positive or negative, or as a degree of positivity or negativity for example. Message features may also comprise a string or text, such as a topics feature, which may be determined by topic analysis or using a topic model. In some embodiments, a decision tree may be utilized to extract and classify the message features, in order to determine message features or feature vector.

Message features determiner 250 also includes a message features inference engine 256. Message features inference engine 256 analyzes the message, and determines contextual features of the message (such as by using data from the user data collection component 210 and/or user activity information from the user activity monitor 280 or from user activity information 242 in user profile 240). As an example, and without limitation, contextual or determined features include determining the relationship of the people involved in the message, behavior features (such as whether the user has recalled the message), whether the message is related to a calendar event, whether the message is related to a particular project, or a location associated with the people identified with the message, whether a recipient is also mentioned in the message, the style on tone of the message (such as whether the message has a business-like tone, or a more personal tone), whether the message has attachments, and the form and content of the attachments, or whether the message contains any links to other content, and the nature of such content. The features identified by message features extractor 254 and message features inference engine 256 are labeled and stored in user profile 240 in labeled message features 248. In some embodiments, the labeling may comprise indexing the messages according to the extracted and/or inferred message features. The labels or indices, and in some embodiments, the corresponding messages, may be stored in labeled messages features 248 such that the feature labels (or index) may be used to identify a set of messages based on one or more features. In some embodiments, the message features corresponding to a particular message comprise a message-feature vector, an n-dimensional vector of numerical or binary values representing the features characterizing the message, which may be stored in labeled messages features 245 and made available to user message model determiner 260, group message model determiner 270, and/or message propriety engine 290 (or other components of system 200).

User message model determiner 260 accesses determined user message features from labeled message features 245, or from message features determiner 250. Using the determined user message features, user message model determiner 260 builds a user message model 262 to determine behavior patterns regarding user messages or how the user sends messages. User message model 262 may include, for example and without limitation, information regarding: recipients for user messages; groups a user sends messages to; timing of messages (including what days/times are associated with certain recipients or certain content, and/or recency of messages and their content and context); message content; message attachments (including the type and content); message vocabulary, grammar or spelling (which may include information about vocabulary used (or avoided) or associated with certain recipients); other message context (such as the number of times per day a user might send a recipient messages). In some embodiments, a user message model may include information indicating counts or frequency of user behaviors (e.g., the number of times a certain group of recipients occur), which may be used to determine or characterize typical behavior patterns. The user message models, determined by user message model determiner 260, may be stored in user profile 240, such as in user message model 247.

In some embodiments, a user message model 247 includes a set of rules or parameters associated with one or more message features. For example, a model might include a profanity parameter to be utilized for scoring a target message for profanity, such as whether profanity is present (Y/N) or a degree of profanity (e.g., a range of zero to ten, for example). In some embodiments, user message models may be initialized to a default state, with default parameters or rules (e.g., continuing the example with profanity, an initial state for the profanity parameter may cause profanity in a target message to be flagged for the user). Model parameters then may be tuned or learned based on features derived from historical messages (such as the information stored in labeled message features 245). For example, based on the user's message history, a profanity parameter may be modified such that some profanity is tolerated in some instances. In some embodiments, the parameters may be configurable by the user or by an administrator. For example, a profanity parameter may be configured by an administrator to cause any messages with profanity that are being sent to recipients outside of an organization to be flagged for user review.

Group message model determiner 270 includes a group features determiner 272 (and may also accesses determined message features from labeled message features 245, or from message features determiner 250). Group features determiner 272 accesses any messages to a group, and extracts features of that group. Group features determiner 272 may determine the existence of a group (e.g., based on how the group is defined, as described below, based on group context, such as contextual information indicating the group members are all working on a common project, for instance, or explicit definition of a group, for example), information about group members (such as, for example, by extracting the identity of members of the group), the vocabulary, grammar, or spelling of messages associated with the group, the roles of the people (or entities) in the group, a particular user's role in the group (group participant, team member, team leader, etc.). The group features determiner 272 might also determine how the group is defined, whether from a list-serv, a pre-defined group, a group identified by a group email alias, a common domain in the email addresses, or a group previously used in other messages.

Additionally, the group message model determiner 270 includes a group context determiner 274. Group context determiner 274 may use features from the group features determiner 272 to determine group context. A group context might be, for example, whether the group is a work group, a personal group, a school group (which might be determined, for example, by determining the email domains of the group). For example, the group context may indicate that the group is a school group made up of parents, teachers and/or school administrators; or might be a working group with a company executive, team leaders and team members, or other contextual information indicating a group or association of people or entities. For example, in one embodiment, group context determiner 274 determines contextual information indicating that group members (or common recipients of messages communicated among these recipients) are associated with a project (or are on a committee or taskforce, or similar working group). For instance, this may be determined by analyzing message features (e.g., attachments and other message content), members' calendar data (including information about meetings organized by group members or attended by group members), file-access information, which may indicate that all or some members of the group access the same project files, location information from the members, user activity of the members (which may include similar activity performed by members, the accessing or sharing of a common set of files or applications, related browsing activity including topics searched on, or other user activity information), or other available information suitable for providing context. Group context might also include whether the group is all male, all female or a mixture of genders.

The group message model determiner also includes a group behavior determiner 276. Group behavior determiner 276 may, in some aspects, determine behavior patterns for the group, and may draw from the features and context from group features determiner 272 and group context determiner 274. The determined group behavior may, in some aspects, include behaviors like: timing of group messages (including what days/times group messages are sent); message styles (e.g., a characterization of the vocabulary, such as is the vocabulary typically business-related, personal, with or without words classified as potentially offensive; grammar and word-spelling information about the messages; information characterizing the formality or structure of messages, such as salutations, closing, name-formality); group message attachments (including the type (such as images, documents or video), style and content); other message context (such as the number of times per day a user might send a recipient messages). The group message model determiner 270 uses information from group features determiner 272, group context determiner 274 and/or group behavior determiner 276 to create a group message model 278, which may be stored in group message models 232 in storage 225. In some embodiments, user message models associated with the group members also may be utilized to create a group message model. Additionally, for those groups associated with a particular user, the corresponding group message model 278 (or a reference pointer to the model) may be stored in user profile 240, such as in user group message models 248.

In some embodiments, group message models 232 include a set of rules or parameters associated with one or more message features, such as described in connection to user message models 247. Similarly, in some embodiments, the parameters or rules or group message model 232 may be configurable by a user or an administrator.

Message propriety engine 290 is generally responsible for analyzing user activity information 242, information from user accounts and devices 244, labeled message features 245, user preferences 246, user message models 247, group message models 232, and/or user group message models 248 to determine the probability of propriety of any particular message including the message compatibility and potential or probable message consequence. As shown in FIG. 2, message propriety engine 290 includes message compatibility determiner 292 and message consequence/importance classifier 294.

Message compatibility determiner 292 operates to, in some aspects, determine a compatibility score indicating a statistical confidence that the "target" message being considered is compatible with other messages sent by the user (the compatibility scores, in some embodiments may be used as an indication of the probability of message propriety, or impropriety). The message compatibility determiner 292, for each new target message, analyzes the target message to extract and/or determine: message features (these message features include any of the message features discussed above with respect to message features determiner 250, and may be extracted by message features determiner 250 and provided to message compatibility determiner 292); and group message features (these group message features include any of the group message features discussed above with respect to group message features determiner 272, and may be extracted by message features determiner 272 and provided to message compatibility determiner 292). In one embodiment, a target message feature vector is determined comprising extracted features of the target message. The target message features (or feature vector) are then compared to the user message model 247 and/or group message model 248 to determine a compatibility score to determine if the target message is compatible with the user message model 247 and/or the group message model 248. In particular, the group message model 248 may be used when the target message features (or feature vector) indicate that the message is being communicated to a known group. In some aspects, this comparison may include comparing against the user message model 247 (or group message model 232): information about the target message vocabulary, spelling, grammar, style, recipients, content context (for example, are any of the recipients mentioned in the text of the message), or attachments (both form, content and consistency). In some embodiments, a feature vector characterizing the target message may be compared to the parameters of a user message model 247 (and in some instances also compared to a group message model 232). In an embodiment, a difference vector may be determined by comparing the target message feature vector and the model(s). In these embodiments, the difference vector may be totaled or scored and compared against a threshold to determine compatibility. For instance, if the threshold is exceeded, then the differences may be great enough as to warrant flagging the target message for the user. The threshold may be pre-defined, such as a threshold set by an administrator or the user, or may be adaptive so that it can learn over time, based on user or group messaging behavior. Additionally, the threshold may be specific to a user or to a group; thus, for instance, one group may have higher threshold thereby implying higher conformity is desired. In an embodiment of message compatibility determiner 292, the parameters of models 247 or 232 and/or logic 230, as described below, may specify utilizing a logical OR operation for one or more features of the target message to determine compatibility. For example, suppose a message containing profanity, an image attachment, overall message sentiment, or informality are not compatible, then features in the target message corresponding to these traits may be logically OR' d such that the present of any one of these traits indicates non-conformity. Similarly, the parameters of models 247 or 232 and/or logic 230 may specify that the presence of a specific feature is controlling to govern compatibility. For instance, if any profanity is present, then the message may be deemed incompatible.

In one comparison, for example, the message compatibility determiner 292 may determine the similarity of the vocabulary between the target message and the user message model 247, including the style, "tone" (such as business or personal, whether certain words classified as potentially offensive are used), or sentiment (such as whether the message sentiment is negative). The message compatibility determiner 292 may also determine the similarity of the context of the target message to the user message model 247 (such as whether messages to the same or similar recipients are sent at similar times, or on similar days of the week) (or if a target message appears to be one of a pattern of messages, and whether the target message appears to be following or deviating from the pattern). If the target message includes attachments, in some aspects the message compatibility determiner 292 may compare the attachments for consistency (for example, are all of the attachments of a similar type, or do all the attachments contain similar subject matter). The message compatibility determiner 292 may also, in some aspects, compare the target message attachments against the user message model 247 to determine compatibility. For example, if the target message includes a video, whether the user message model 247 indicates that similar messages in the user message model 247 also included video attachments (for example, the user has attached videos in messages to the same or similar recipients). The message compatibility determiner 292 may also, in some aspects, determine that the target message is similar to other messages, or a pattern of user messages, in the user message model 247, but deviates from this message in some way (for example, has the user recently sent a series of messages to a first user, using similar text or attachments, but the target message has text or attachments similar to the series of messages, but is instead addressed to a second user (perhaps due to an email alias auto-complete resulting in a mis-addressed message).

If the target message is a group message, the message compatibility determiner 292 will, in some aspects, also compare the target message features against the group message model 248. This comparison could include, for example, a comparison of the target group message to messages in the group message model 248 having the same recipients, or could be a comparison of the target group messages to messages in the group message model 248 having any group recipients. For example, if a user is new to a group as a recently added member, the message compatibility determiner 292 will, in some aspects, compare the target group message to other similar group messages in the group message model. The text (or vocabulary) of the target group message, as well as the style, sentiment and context of the target group message may be also compared to the group message model 248.

The message consequence/importance determiner 294, for each new target message, analyzes the target message to determine probable consequences and/or an importance of the target message. The message consequence/importance determiner 294 may, in some aspects, determine whether any obscene, personally identifying (such as a social security number), and/or financial (such as credit card information) information is contained within, or attached to, the message. So, in some aspects, this determination assesses the risks associated with sending the target message based upon the target message features (again, these message features may include any of the message features discussed above with respect to message features determiner 250, and may be extracted by message features determiner 250). As the consequences and/or importance of the target message increase, the threshold for the message compatibility may decrease (or the threshold for message propriety probability may increase). As an example, if a target message is determined to have increased negative consequences if sent to the wrong recipient (for example, by using obscene language), or if the target message is determined to have increased importance (for example, if the recipients include the entire leadership team of the user's company), the threshold compatibility score giving rise to a user alert may be lowered, reflecting the increased risk of an erroneously sent message.

Message compatibility determiner 292 and message consequence/importance classifier 294 may use logic 230 that includes rules, conditions, associations, classification models, or other criteria, for comparing the features of different messages and determining a probability that the target message is compatible with the user message model 247 and group message model 248, and the probable consequences or importance of the target message. For example, in one embodiment, logic 230 may include identifying a set of one or more features of a target message, accessing a user message model and/or a user group message model, and comparing the identified set of features in the target message to the user message model and/or a user group message model to determine a degree of similarity among the corresponding features. In other words, a feature of the target message, such as a feature characterizing the topic or subject matter of the message (potentially offensive), may be identified and compared to a corresponding feature of the user message model and/or the user group message model (i.e., features with similarly characterized topic or subject matter). Based on the comparison, the logic 230 can determine a confidence in the propriety of the target message. In some embodiments, where a number of corresponding features are sufficiently similar, which may be determined using a similarity threshold which may specify, for instance, a number of features necessary to be identical and/or degree(s) of variance in feature values that are permissible in order for two corresponding features to be determined as sufficiently similar (and thus increasing the confidence in the determined message propriety). The classification logic 230 may also consider the context surrounding the message (for example, did the user enter two characters of an email alias, followed by an auto-complete function, or did the user manually enter all of the characters of the email alias (where the probability of error is increased in the auto-complete scenario)).

Accordingly, classification logic 230 can take many different forms depending on the particular features being compared and the mechanism(s) used to determine message propriety. For example, the classification logic may include training data based on message features of the user message model and/or group message models, and can be used to train a neural network classifier for determining whether a target message is similar to (i.e., should be classified as being related to) the user message models and/or the group message models. As another example embodiment, statistical clustering may be performed on feature vectors of a target message and to compare features of the user message models and/or group message models to determine. In some embodiments, default logic may be implemented as part of a default user message model or group message model (for example, the default logic may cause message propriety engine 290 to create a message notification when profanity or other default offensive language is used). In other embodiments, an administrator of a network may be given authority to create default user message models or group message models that have predetermined settings based on the preferences of the administrator (for example, video attachments over a certain size may cause a message notification).

In some embodiments, classification logic 230 may comprise decision tree or random decision forests, fuzzy logic, neural network, finite state machine, support vector machine, logistic regression, clustering, or machine-learning techniques, similar statistical classification processes, or combinations of these to identify message propriety. As one example and at a high level, logic 230 (and thus message propriety engine 290) can examine the vocabulary features of a target message, and compare it to the vocabulary features of user message models 247, user group message models 248 or group message models 232.

Figure 3:
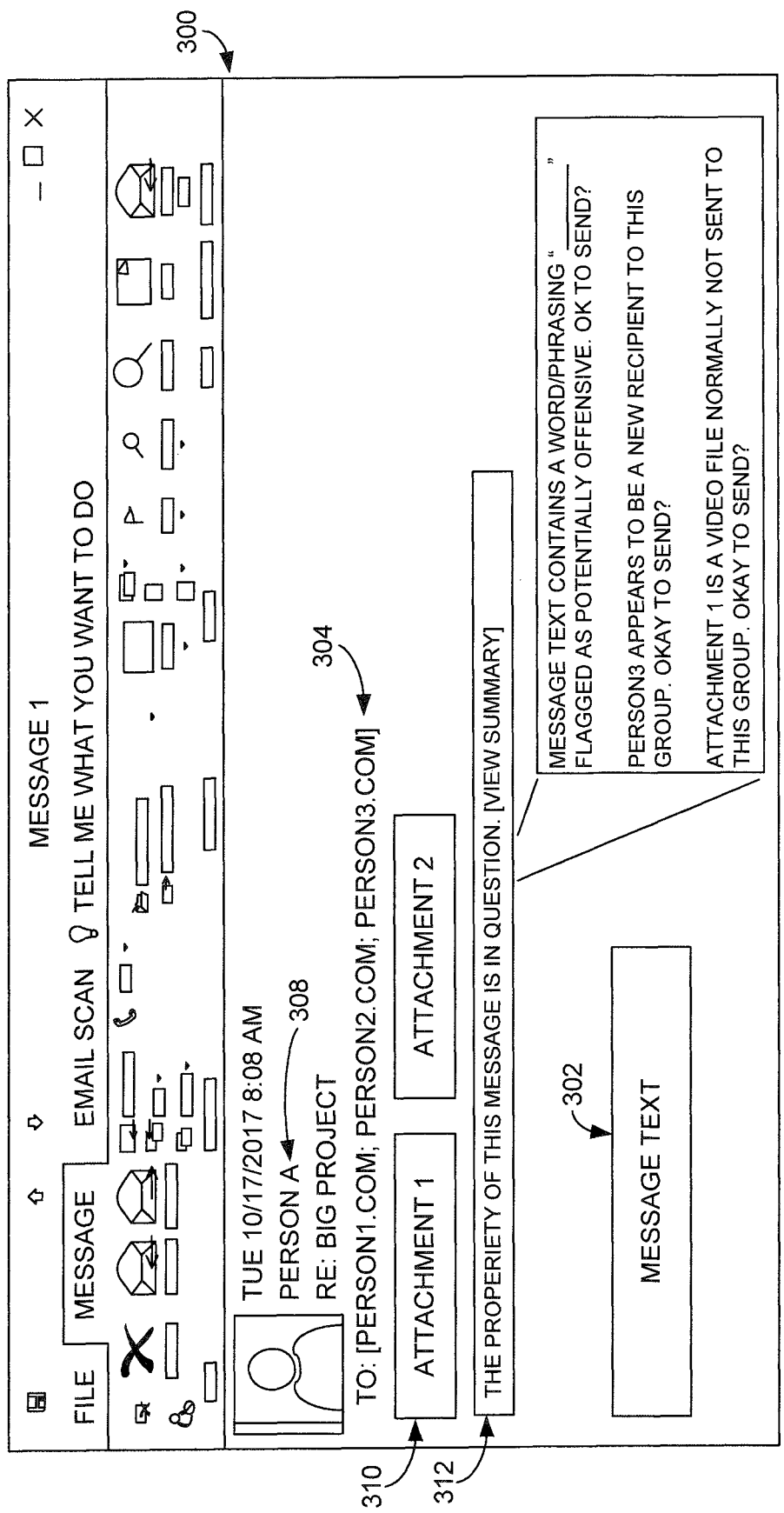
FIG. 3 illustratively depicts an exemplary screenshot from a personal computing device showing aspects of an example graphical user interface, in accordance with an embodiment of the present disclosure.

If the propriety of a target message, or a part of a target message, is in question, a message notification may be presented to the user, generated by message notification presentation engine 295 and presented by presentation component 220. An example message 300 is shown in FIG. 3. Example message 300 includes example message text 302 addressed to group recipients 304 (shown as person1.com; person2.com; person3.com). The example target message is from user 308 (shown as "personA") and includes attachments 310 (shown as attachment1 and attachment2). If the propriety of example target message 300, or a part of example target message 300, is in question, a message alert 312 may be presented to the user, generated by message notification presentation engine 295 and presented by presentation component 220. Message alert 312 may include text, highlighting, sound, or other mechanisms to alert the user. Message alert 312 may also indicate the cause of the alert. For example, message alert 312 includes an option to view a summary of the cause of the alert. As shown, the summary may indicate that the message text 302 contains words or phrasing that were flagged as potentially offensive, and may include the possibly offending words or phrases. As another example, the summary may indicate that "person3.com" is a new recipient to the group. As yet another example, the summary may indicate that one of the attachments 310 is a video file, and that video files are not normally sent to this recipient group. Prior to sending the example target message 300, the user is informed of potential compatibility issues associated with the target message. In each case, the user may be presented with an option "okay to send?" or similar option, allowing the user to review the summary and decide to send the target message as is. As the user sends target messages, the user message model 247 and the group message model 248 are updated, allowing the models to change over time. For example, if message notification engine 295 presents a message notification, and the user opts to send the target message, the user message model 247 and/or the group message model are updated, now reflecting that features giving rise to the message notification may not negatively impact the message propriety. In some embodiments, the likelihood or confidence of message propriety merely increases, based on the entirety of the user message model and/or group message model.

As described above, in some embodiments, message notification presentation engine 295 includes functionality for creating or summarizing the cause of the message notification for presentation to a user. In particular, some embodiments of message notification presentation engine 295 use rules or logic (which may be similar to logic 230) to extract and/or summarize all or portions of a message. For example, a content summary may be generated from the message content corresponding to those message features of the target message that gave rise to the message notification questioning the message propriety. For instance, the summary may be generated using topic modeling or automatic summarization, which may include extraction or abstraction. In some embodiments, thesis or topic sentences may be identified and labeled or extracted for use in a summary (In some embodiments, this analysis is carried out by message features determiner 250.) For example, for a message that includes potentially offensive content, a summary of the content may be identified and tagged or labeled so that it may be presented in a summary in the message notification.

In some embodiments, message propriety engine 290 provides a message propriety and an associated message propriety confidence score, or message propriety probability, which may reflect the likelihood that a user would find the message proper to send. More specifically, in some embodiments, a corresponding confidence weight or confidence score may be determined regarding message propriety. As one example, the confidence score may be based on the strength of the similarity to the user message model 247 and/or the user group message model 248, which may be determined based on the number of similar message features, types of features, and/or degree of similarity of the message features in common. The propriety confidence score may correspond to the probability that the message is proper as determined by message propriety engine 290 using logic 230. For example, in some embodiments, a minimum propriety confidence score may be established, below which a message notification is generated by message notification presentation engine 295.

Example system 200 also includes a presentation component 220 that is generally responsible for presenting message displays and related information (such as message notifications) to a user. In one embodiment, message notification presentation engine 295 may operate in conjunction with or may be implemented as one part of presentation component 220. Presentation component 220 may comprise one or more applications or services on a user device, across multiple user devices, or in the cloud. For example, in one embodiment, presentation component 220 manages the presentation of messages and message content to a user across multiple user devices associated with that user. Based on, presentation logic or instructions provided by message notification presentation engine 295, context (which may be received from user activity monitor 280), and/or other user data, presentation component 220 may determine on which user device(s) content is presented, as well as the context of the presentation, such as how (or in what format and how much content, which can be dependent on the user device or context) it is presented, when it is presented, or other such aspects of presentation.

In some embodiments, presentation component 220 generates user interface features associated with or used to facilitate presenting to the user aspects of enhanced or personalized message content (such as message notifications regarding message propriety). Such features can include interface elements (such as icons or indicators, graphics buttons, sliders, menus, audio prompts, alerts, alarms, vibrations, pop-up windows, notification-bar or status-bar items, in-app notifications, or other similar features for interfacing with a user), queries, and prompts.

Example system 200 also includes storage 225. Storage 225 generally stores information including data, computer instructions (e.g., software program instructions, routines, or services), logic, profiles, and/or models used in embodiments described herein. In an embodiment, storage 225 comprises a data store (or computer data memory). Further, although depicted as a single data store component, storage 225 may be embodied as one or more data stores or may be in the cloud.

As shown in example system 200, storage 225 includes 230 and user profiles 240. One example embodiment of a user profile 240 is illustratively provided in FIG. 2. Example user profile 240 includes information associated with a particular user such as user activity information 242, information about user accounts and devices 244, user preferences 246, labeled message features 248, and enhanced message tags 249. The information stored in user profile 240 may be available to the message features determiner 250, user message model determiner 260, group message model determiner 270, message propriety engine 290 or other components of example system 200.

As described previously, user activity information 242 generally includes user information about user actions or activity events, related contextual information, activity features, or other information determined via user activity monitor 280, and may include historical or current user activity information. User accounts and devices 244 generally includes information about user devices accessed, used, or otherwise associated with a the user, and/or information related to user accounts associated with the user, for example, online or cloud-based accounts (e.g., email, social media) such as a Microsoft® Net Passport, other accounts such as entertainment or gaming-related accounts (e.g., Xbox Live, Netflix, online game subscription accounts), user data relating to accounts such as user emails, texts, instant messages, calls, other communications, and other content; social network accounts and data, such as news feeds; online activity; and calendars, appointments, application data, other user accounts, or the like. Some embodiments of user accounts and devices 244 may store information across one or more databases, knowledge graphs, or data structures. As described previously, the information stored in user accounts and devices 244 may be determined from user-data collection component 210 or user activity monitor 280 (including one of its subcomponents).

User preferences 246 generally include user settings or preferences associated with user messaging applications, and can also include, in some embodiments, user message model 247 parameter settings and threshold (comparison/compatibility) settings. By way of example and not limitation, such settings may include user preferences about specific addressees or entities to whom the user considers any messages to be proper, and thresholds, and/or display preferences, as described herein. As described previously, labeled message features 245 may include one or more features from messages determined by message features determiner 250. User profile 240 further includes user message models 247 and user group message models 248.

Figure 4:
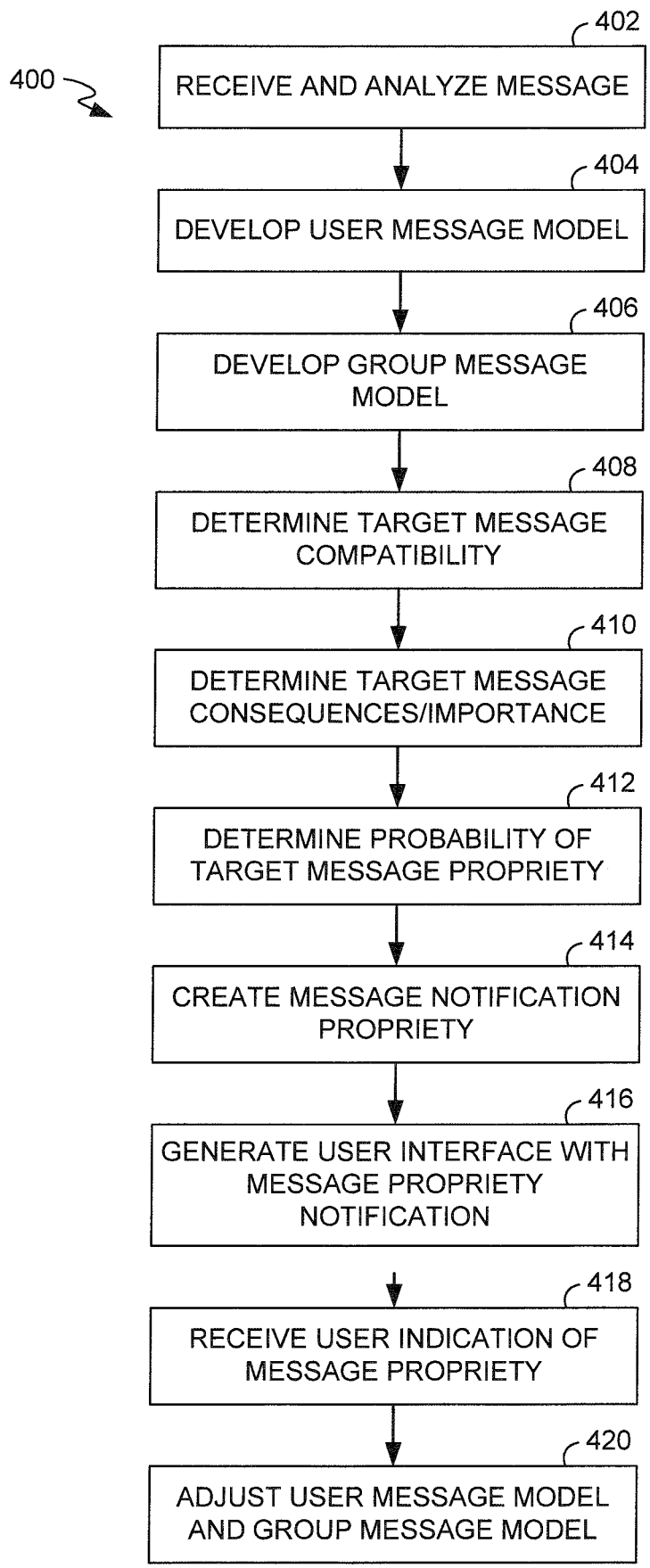
FIG. 4 depicts a flow diagram of methods for determining message propriety, in accordance with an embodiment of the present disclosure.

Turning to FIG. 4, a method 400 for determining message propriety is shown. Each block or step of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few. Accordingly, method 400 may be performed by one or more computing devices, such as a smartphone or other user device, a server, or by a distributed computing platform, such as in the cloud.

Accordingly, as shown at block 402, the method 400 includes receiving and analyzing a set of electronic messages. The message (or messages) may be analyzed to determining message features characterizing the message (by message features determiner 250). After a message or messages are received and analyzed to determine message features, as shown at block 404, the method includes determining or developing a user message model (by user message model determiner 260). Method 400 continues at block 406 by determining or developing one or more group message models (by group message model determiner 270). The determining at blocks 404 and 406 may be performed before any messages are received, such that the user message model and group message model are predetermined. If this is the case, the method 400 can proceed, in some embodiments, from block 402 directly to block 408. At block 408, the method includes determining a target message compatibility (with message compatibility determiner 292 of message propriety engine 290). Method 400 also includes, at block 410, determining the possible consequences and/or importance of the target message (by message consequence/importance classifier 294). The method 400 continues at block 412 by determining the probability of message propriety (by message propriety engine 290, using one or more of the results of blocks 410 and 412). Based on the determined probability, the method may include invoking an action associated with the target message (which may include for example, presenting a notification to the user, a summary or rationale regarding the determined probability, blocking the message, continuing the action without any intervention). If the message propriety is in question (such as if the probability of message propriety is below a threshold), at block 414, the method 400 continues by creating a message propriety notification (by message notification presentation engine 295). If a message propriety notification is created, the method 400 continues at block 416, by generating a user interface with the message propriety notification.

Accordingly, we have described various aspects of technology directed to systems and methods for determining the propriety of electronic messages before they are sent on personal computing devices. It is understood that various features, sub-combinations, and modifications of the embodiments described herein are of utility and may be employed in other embodiments without reference to other features or sub-combinations. Moreover, the order and sequences of steps shown in the example method 400 are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 5:
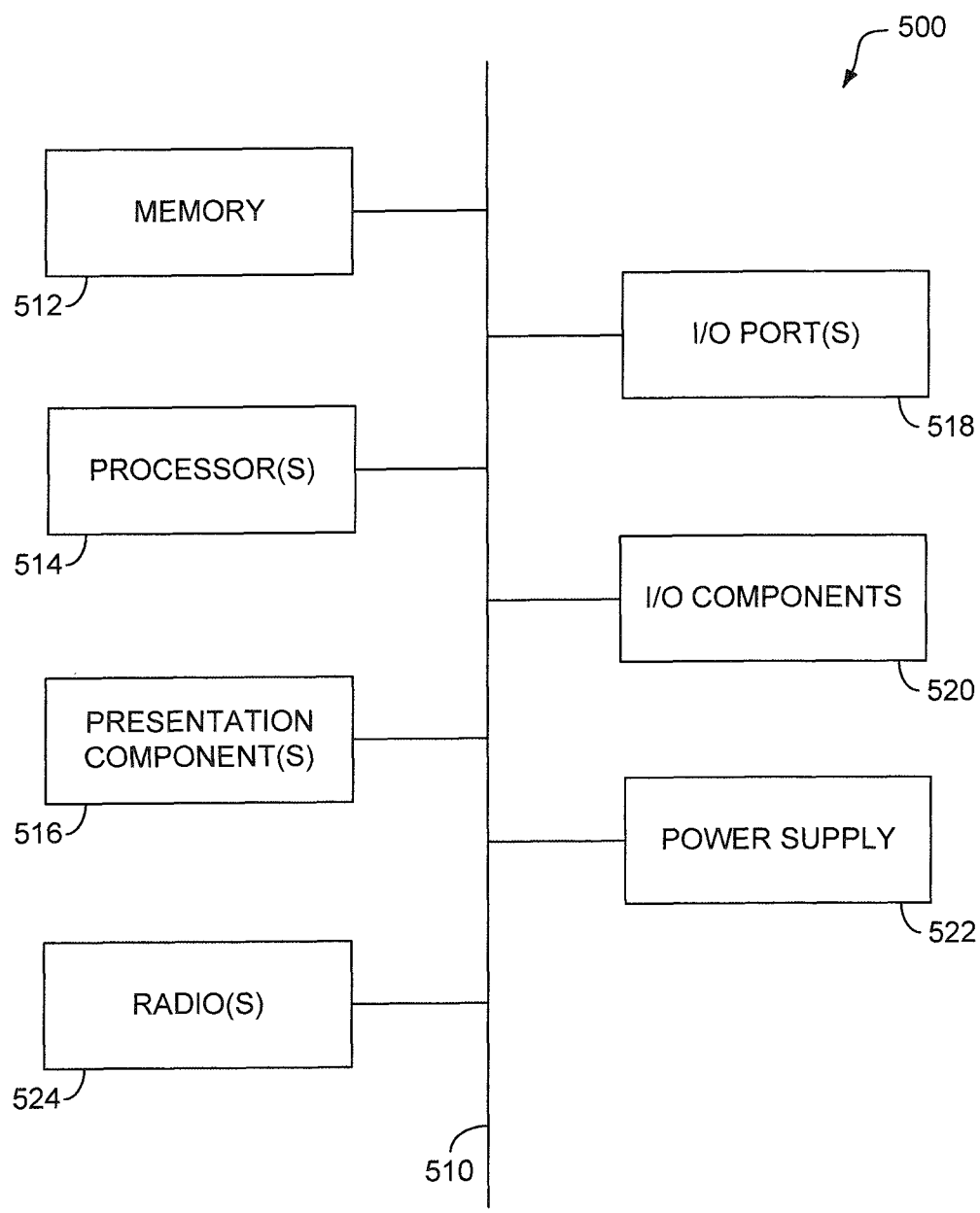
FIG. 5 is a block diagram of an exemplary computing environment suitable for use in implementing an embodiment of the present disclosure.

Having described various implementations, an exemplary computing environment suitable for implementing embodiments of the disclosure is now described. With reference to FIG. 5, an exemplary computing device is provided and referred to generally as computing device 500. The computing device 500 is but one example of a suitable computing environment and is not intended to suggest any limitation as to the scope of use or functionality of embodiments of the disclosure. Neither should the computing device 500 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, or more specialty computing devices. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 5, computing device 500 includes a bus 510 that directly or indirectly couples the following devices: memory 512, one or more processors 514, one or more presentation components 516, one or more input/output (I/O) ports 518, one or more I/O components 520, and an illustrative power supply 522. Bus 510 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with one or more embodiments of the present disclosure. Distinction is not made between such categories as "workstation,"

"server," "laptop," or "handheld device," as all are contemplated within the scope of FIG. 5 and with reference to "computing device."

Computing device 500 typically includes a variety of computer-readable media. Computer-readable media can be any available media that can be accessed by computing device 500 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include for example solid-state memory, hard drives, and optical-disc drives. Computing device 500 includes one or more processors 514 that read data from various entities such as memory 512 or I/O components 520. Presentation component(s) 516 presents data indications to a user or other device. Exemplary presentation components include a display device, speaker, printing component, vibrating component, and the like.

The I/O ports 518 allow computing device 500 to be logically coupled to other devices, including I/O components 520, some of which may be built in. Illustrative components include a microphone, joystick, game pad, satellite dish, scanner, printer, or a wireless device. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

Some embodiments of computing device 500 may include one or more radio(s) 524 (or similar wireless communication components). The radio transmits and receives radio or wireless communications. The computing device 500 may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computing system for controlling delivery of electronic messages, by one or more user devices, the computing system comprising:
   one or more sensors configured to provide sensor data including user-activity related information;
   one or more processors; and
   computer storage memory having computer-executable instructions stored thereon which, when executed by the one or more processors, implement a method for controlling delivery of messages, the method comprising:
   analyzing features of a first electronic message to be sent by a first user from a user device to one or more recipients, the one or more recipients including a second user;
   accessing a data store comprising prior electronic messages from a first user log of prior communications of an account accessible by the first user;

based on features of the prior electronic messages, determining a set of the prior electronic messages that are related to the first electronic message;

comparing the features of the first electronic message to be sent to information based on the features of the set of the prior electronic messages related to the first electronic message;

determining, based at least on the comparing, a probability of a propriety of sending the first electronic message to the second user; and based on the determined probability of the propriety, invoking an action associated with the first electronic message.

2. The computing system of claim 1, wherein when the determined probability of the propriety of sending the first electronic message is below a probability of propriety threshold, then invoking the action comprises presenting a user notification on the user device.

3. The computing system of claim 2, wherein the user notification includes a rationale for the user notification.

4. The computing system of claim 3, wherein the rationale includes at least a summary of a potential message impropriety.

5. The computing system of claim 1, wherein the determined set of the prior electronic messages related to the first electronic message includes a user message model that is determined by user features which are determined and stored in a user profile, characterizing aspects of a user.

6. The computing system of claim 5, wherein the user features are determined, at least in part, based on at least one of a determined user activity and a determined user context.

7. The computing system of claim 1, wherein the determined set of the prior electronic messages related to the first electronic message includes a group message model determined by group message features characterizing aspects of a set of prior group electronic messages.

8. A method for controlling presentation of electronic messages on one or more user devices, the method comprising:

determining features characterizing a first electronic message to be sent by a first user from a user device to one or more recipients, the one or more recipients including a second user;

accessing a data store comprising prior electronic messages from a first user log of prior communications of an account accessible by the first user;

accessing features of any of a set of the prior electronic messages that are related to the features of the first electronic message;

comparing the features of the first electronic message to be sent to information based on the accessed features of the set of the prior electronic messages related to the first electronic message;

determining, based at least on the comparing, a probability of a propriety of sending the first electronic message to the second user; and based on the determined probability of the propriety, invoking an action associated with the first electronic message.

9. The method of claim 8, wherein when the determined probability of the propriety of sending the first electronic message is below a probability of propriety threshold, then invoking the action comprises presenting a user notification on the user device.

10. The method of claim 9, wherein the user notification includes a rationale for the user notification.

11. The method of claim 10, wherein the rationale includes at least a summary of a probable message impropriety.

12. The method of claim 8, wherein the set of the prior electronic messages related to the first electronic message includes a user message model that is determined by user features which are determined and stored in a user profile, characterizing aspects of a user.

13. The method of claim 12, wherein the user features are determined, at least in part, based on at least one of a determined user activity and a determined user context.

14. The method of claim 8, wherein the set of the prior electronic messages related to the first electronic message includes a group message model determined by group message features characterizing aspects of a set of prior group electronic messages.

15. A method for controlling presentation of electronic messages on one or more user devices, the method comprising:

analyzing features of a first electronic message to be sent by a first user from a user device to one or more recipients, the one or more recipients including a second user;

accessing a data store comprising prior electronic messages from a first user log of prior communications of an account accessible by the first user;

comparing the features of the first electronic message to be sent to at least one stored model based on features of a set of the prior electronic messages;

determining, based at least on the comparing, a probability of a propriety of sending the first electronic message to the second user; and based on the determined probability of the propriety, invoking an action associated with the first electronic message.

16. The method of claim 15, wherein, when the determined probability of the propriety of sending the first electronic message is below a probability of propriety threshold, then invoking the action comprises presenting a user notification on the user device.

17. The method of claim 16, wherein the user notification includes a rationale for the user notification.

18. The method of claim 16, wherein the at least one stored model includes a user message model that is determined by user features which are determined and stored in a user profile, characterizing aspects of a user.

19. The method of claim 16, wherein the at least one stored model includes a group message model determined by group message features characterizing aspects of a set of prior group electronic messages.

20. The method of claim 18, wherein the user features are determined, at least in part, based on at least one of a determined user activity and a determined user context.

* * * * *